Figure 1:
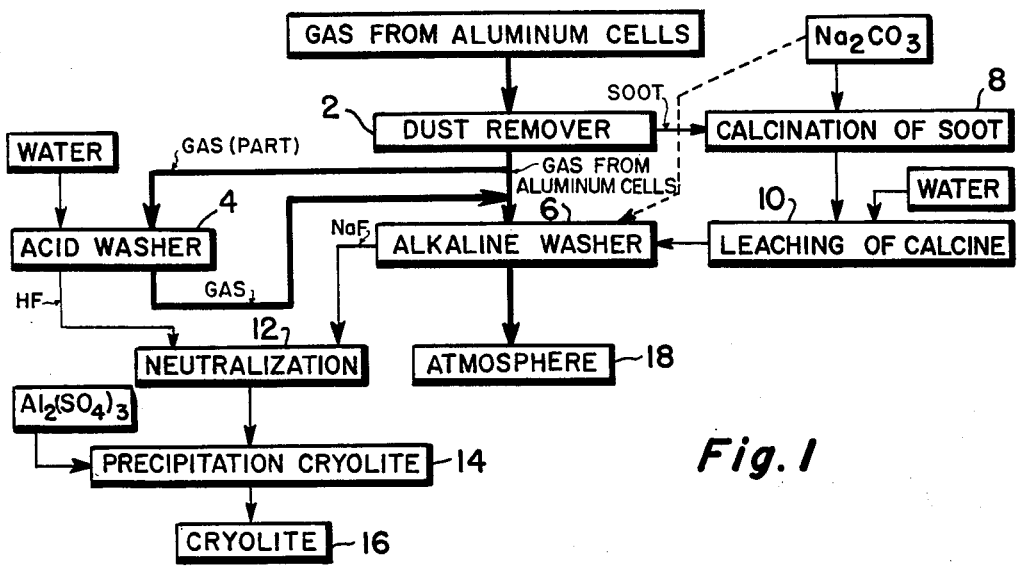

— = Gas
— = Liquid

INVENTORS
Jean Berthoux
Paul Mollard
Roger Papp

THEIR ATTORNEYS

United States Patent Office 3,132,921
Patented May 12, 1964

3,132,921
PROCESS FOR PRODUCTION OF CRYOLITE FROM FLUORINATED COMPOUNDS IN GASES
Jean Berthoux, Albertville, Savoie, Paul Mollard, Sainte-Foy-les-Lyon, Rhone, and Roger Papp, Grenoble, Isere, France, assignors to Societe d'Electro-Chimie, d'Electro-Metallurgie et des Acieries Electriques d'Ugine, Paris, France, a corporation of France
Filed Feb. 20, 1962, Ser. No. 174,626
Claims priority, application France Feb. 24, 1961
7 Claims. (Cl. 23—88)

The production of aluminum by electrolysis of melted fluorine baths generally results in an emission of gases, carbon dioxide, carbon monoxide, dusts and smokes, formed chiefly of sulphur dioxide, fluorine compounds as gases and dusts, soots and tars.

For various reasons, in particular salubrity, it is necessary to purify these gases and smokes before discharging them into the atmosphere. Generally, this purifying is carried out in two steps: first a dust removal, then a washing to eliminate fluorine compounds and sulphur dioxide. Fluorine being an element of value, it has also been attempted to recover the fluorine compounds contained either in the soots from the dust removal, or in the gases. But usually, the utilized processes give a cryolite difficult to filter, which indeed may be directly used in the electrolytic cells, but is likely to involve difficulties owing to the variableness of the product composition. In consequence, the efficiency of such process is rather low.

The present invention relates to a new process for recovering the fluorine contained in the gases and soots resulting from the electrolytic production of aluminum, which essentially comprises the following steps:

(a) The dust in the gases from the electrolytic cells is removed in the dry state by any known means, in particular by electrostatic dust removal means. Soots are thus recovered.

(b) Once freed from dust, a part or all of these gases are washed with water in an acid medium, and the washing solution is recycled.

(c) Then, the gases pass into a second washing system where they are put into contact with an alkaline solution, preferably of sodium hydroxide or sodium carbonate, which absorbs the fluorine products with an efficiency above 99%, as well as the sulphur dioxide.

(d) After this alkaline washing the purified gases are sent to the chimney.

(e) Simultaneously sodium carbonate is mixed with the soots obtained by the dust removal step (a). The soots-sodium carbonate mixture is calcined and the obtained calcine is leached with water, as described in Armand et al. application Serial No. 117,839, filed June 19, 1961, now abandoned, for "Process for Recovering Fluorine from the Soots Entrained in the Residual Gases Resulting From the Electrolytic Production of Aluminum." The leach liquor thus obtained is strongly alkaline, its pH approaching 10 to 12.

(f) The strongly alkaline leach liquor is introduced into the alkaline washer by step (c) where its alkalinity is decreased to a pH above 7, i.e., a pH comprised between 7 and 9, the preferred pH being near but above 7.

(g) The whole solution coming from the alkaline washer is neutralized to pH 7 by adding thereto the diluted solution of hydrofluoric acid obtained by the water washing in acid medium of step (b).

(h) Once filtered, aluminum sulphate is added to the solution thus neutralized so as to precipitate cryolite.

(i) The solution obtained by washing all or part of the gases with water in an acid medium, partially used for neutralization in step (g), is also suitable for the obtention of cryolite by precipitating it in the presence of sodium aluminate.

FIGURE 1 shows a first embodiment of the invention. Dust is removed from the gases by dust remover 2. Only a portion of the gases freed from dust is washed with water in an acid medium in acid washer 4 according to step (b) in order to absorb the hydrofluoric acid contained in it. After this treatment, this portion of gases is sent to the alkaline washer 6.

Sodium carbonate is mixed in calciner 8 with soot from dust remover 2 and the mixture is calcined. The calcine is leached with water in vessel 10 and the strongly alkaline leach liquor is sent to the alkaline washer 6 where its alkalinity is decreased to a pH above but preferably near 7. The solution coming out of the alkaline washer 6 is sent to a neutralizer 12 where its alkalinity is lowered to about pH 7 by hydrofluoric acid solution coming from acid washer 4. The solution from neutralizer 12 is sent to a precipitation vessel 14 where aluminum sulphate is added to it to precipitate cryolite, which is removed as shown at 16.

Gas from the aluminum cells passes through dust remover 2 and alkaline washer 6 to the atmosphere designated by reference numeral 18.

In this embodiment, the fluorine is recovered from two solutions. The first solution comes from the alkaline washer 6 and contains all the fluorine of the soots and dusts recovered by dust remover 2 in step (a), and also a portion of the fluorine from the gases; the said portion results from the difference between the total quantity of fluorine contained in the gases issuing from the dust remover 2 and that absorbed from the gases treated in the acid washer 4. The second solution comes from the acid washer 4 and contains the hydrofluoric acid necessary for neutralization in neutralizer 12 according to step (g).

In this embodiment, the acid washer, as it does not treat all the gases, is of reduced dimensions and, thereby, its construction, which is necessarily protected against corrosion, is facilitated.

Figure 2:
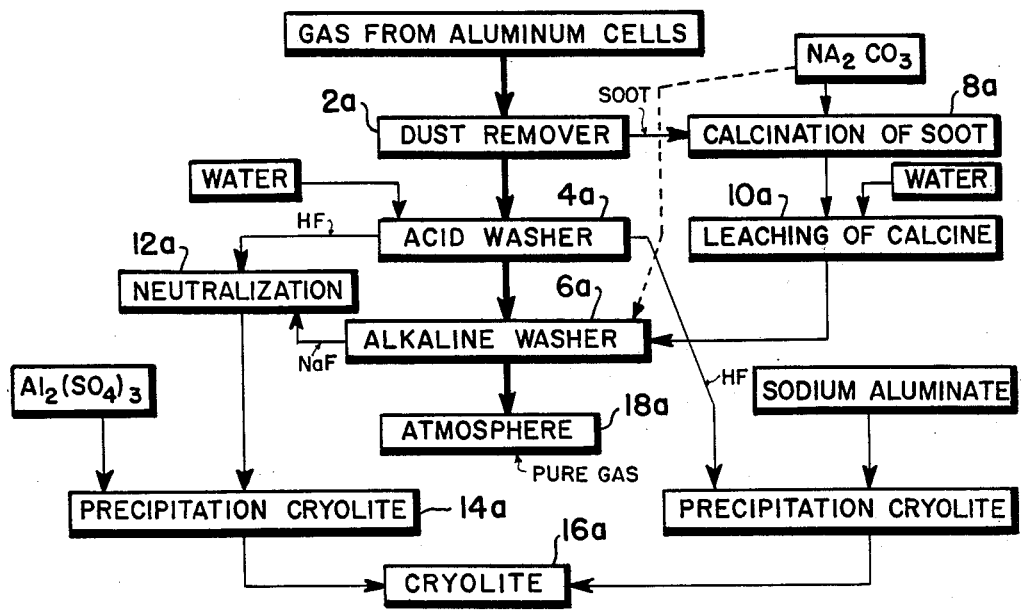

A second embodiment, also in accordance with the invention, is shown in FIGURE 2. In this figure, parts corresponding to those in FIGURE 1 are designated by the same reference numerals with the letter "a" suffixed. In FIGURE 2, according to step (b), all the gases from dust remover 2a pass through a water washer 4a in an acid medium wherein a portion of the hydrofluoric acid in the gases is absorbed.

A part of the obtained acid solution is used for the neutralization in neutralizer 12a of the solution coming from the alkaline washer 6a, and the surplus is mixed with sodium aluminate to produce cryolite.

The alkaline solution coming from the alkaline washer 6a contains all the fluorine of the soot and dust recovered by dust remover 2a in step (a), and also all of the fluorine of the gases not absorbed by the acid washer 4a. The total recovery efficiency is above 99%.

The recovery efficiency of the acid washer 4a is of little importance. It has influence only on the distribution of the cryolite made from either the alkaline solution coming from the alkaline washer 6a or from the acid solution coming from the acid washer 4a.

The construction of the acid washer 4a, which is necessarily protected against corrosion, may therefore be simplified.

To precipitate cryolite, it is advantageous to utilize the technique described in applicant's French Patent 1,187,352 and additional patent of September 24, 1959.

According to this technique, it is possible to regulate at will the granulation of the obtained cryolite, which considerably simplifies filtration and drying.

In the case of precipitation from sodium fluoride solutions containing sodium sulphate, this technique allows a considerable reduction of the sulphur content of the produced cryolite, and thus the obtention of a product of

Example I

(Referring to FIGURE 1)

The aspiration carried out in an electrolysis hall for aluminum production gave a gas flow of 25 m.$^3$/second which, after dust removal in an electrofilter 2, contained 320 mg. fluorine and 80 mg. sulphur dioxide per m.$^3$.

3 m.$^3$/second were taken off this gaseous stream and washed with water in acid washer 4. This washing efficiency was about 85% as regards the recovery of fluorine products, the sulphur not being removed by the water.

The gases thus treated were mixed with the remaining 22 m.$^3$/second coming from the dust remover 2 and sent to the alkaline washer 6 which was fed with a recycled solution of sodium carbonate. The alkaline washer 6 was maintained at a pH of about 8, in order to avoid the risk of corroding the apparatus.

Besides the constant addition of sodium carbonate solution, this washer 6 received the leaching liquor of the products obtained by calcining in calciner 8 the soots from the electrofilter 2 and sodium carbonate.

After their passage through the alkaline washer 6, the gases were freed from more than 99% of the fluorine compounds and the sulphur.

The liquor extracted from the alkaline washer 6 contained about 10 g. fluorine and 1 g. sulphur per liter. It was neutralized to pH 7 in neutralizer 12 by adding the diluted hydrofluoric acid solution from the acid washer 4.

At last, aluminum sulphate was added to the neutralized solution to precipitate the cryolite. The average granulation of said cryolite was 100 microns and its sulphur content was lower than 0.3%.

Example II

(Referring to FIGURE 2)

The aspiration carried out in an electrolysis hall for aluminum production gave a gas flow of 15 m.$^3$/second which, after dust removal in an electrofilter 2a, contained 450 mg. fluorine and 110 mg. sulphur dioxide per m.$^3$.

This gaseous stream was treated in a water washing tower (acid washer 4a); the obtained hydrofluoric acid solution was recycled up to the obtention of a fluorine content comprised between 10 and 20 grams per liter.

The removal of the hydrofluoric acid from the gases in this washing tower depended on the amount of recycled solution. Such removal was purposely limited to 80% in order to maintain in the gases coming out of the tower a sufficient amount of hydrofluoric acid to neutralize the excess of sodium carbonate introduced into the alkaline washer 6a with the leach liquor from leaching vessel 10a. This leach liquor results from leaching with water a calcine of a mixture of sodium carbonate and soots coming from the dust remover 2a.

The gases from the acid washer 4a were passed through the alkaline washer 6a which freed them from hydrofluoric acid and sulphur dioxide where the intimate contact between the gases and the recycled sodium carbonate solution allowed a removal of nearly 99%.

In this example the sodium carbonate necessary for the total purification of the gases was almost entirely provided by the excess of this reagent introduced for treating soots and dusts. Therefore the consumption of sodium carbonate was as low as possible; this characteristic is economically important.

The whole amount of fluorine in the gases to be treated and in the entrained dust was 580 kg. per day as hydrofluoric acid and 200 kg. as diverse fluorides in the dust.

Less than 6 kg./day of fluorine was discharged into the atmosphere with the purified gases.

The amount of precipitated cryolite from the acid and alkaline solutions was 1300 kg. per day. The average granulation of this cryolite was 70 microns and its average sulphur content was lower than 0.12%.

We claim:

1. A process for recovering, in the form of cryolite, the fluorine contained in the gases and entrained dust resulting from the electrolytic production of aluminum, which comprises separating the dust from the gases, washing at least a portion of the gases with water in an acid medium to extract a portion of the fluorine as hydrogen fluoride and form a hydrofluoric acid solution, mixing the dust with sodium carbonate, calcining the mixture, leaching the calcine with water, separating the alkaline leach liquor from the residue, washing all of the gases including those gases not washed in said acid medium and those gases previously washed in said acid medium with an alkaline solution having a pH above 7 and formed at least in part from said alkaline leach liquor, thereby removing fluorine from the gases and forming an alkaline sodium fluoride solution, forming a neutral solution having a pH of about 7 by mixing said alkaline sodium fluoride solution and said hydrofluoric acid solution, and adding aluminum sulphate to said neutral solution to precipitate cryolite.

2. A process according to claim 1, wherein all of the gases to be treated are washed with water in said acid medium.

3. A process for recovering, in the form of cryolite, the fluorine contained in the gases and entrained dust resulting from the electrolytic production of aluminum, which comprises separating the dust from the gases, dividing the gases into a main gas stream and an auxiliary gas stream, washing the auxiliary stream of gases with water in an acid medium to extract a portion of the fluorine as hydrogen fluoride and form a hydrofluoric acid solution, returning the thus treated gases to the main gas stream, mixing the dust with sodium carbonate, calcining the mixture, leaching the calcine with water, separating the alkaline leach liquor from the residue, washing all of the gases including said auxiliary stream gases previously washed in said acid medium and said main stream gases not washed in said acid medium with an alkaline solution having a pH above 7 and formed at least in part from said alkaline leach liquor, thereby removing fluorine from the gases and forming an alkaline sodium fluoride solution, forming a neutral solution having a pH of about 7 by mixing said alkaline sodium fluoride solution and said hydrofluoric acid solution, and adding aluminum sulphate to said neutral solution to precipitate cryolite.

4. A process according to claim 1, wherein said alkaline solution having a pH above 7 is formed by adding sodium carbonate to said alkaline leach liquor.

5. A process according to claim 2, wherein said alkaline solution having a pH above 7 is formed by adding sodium carbonate to said alkaline leach liquor.

6. A process according to claim 3, wherein said alkaline solution having a pH above 7 is formed by adding sodium carbonate to said alkaline leach liquor.

7. A process according to claim 1, wherein a portion of said hydrofluoric acid solution is treated by a solution of sodium aluminate.

References Cited in the file of this patent

UNITED STATES PATENTS

| | | |
|---|---|---|
| 2,231,309 | Weber | Feb. 11, 1941 |
| 2,567,544 | Brodal et al. | Sept. 11, 1951 |
| 2,692,186 | Kamlet | Oct. 19, 1954 |
| 2,732,283 | Clukey | Jan. 24, 1956 |
| 2,813,000 | Quittenton | Nov. 12, 1957 |
| 2,943,914 | Moser | July 5, 1960 |
| 2,991,159 | Wendt | July 4, 1961 |

FOREIGN PATENTS

| | | |
|---|---|---|
| 838,703 | Great Britain | June 22, 1960 |